(12) United States Patent
Theimer et al.

(10) Patent No.: US 9,178,953 B2
(45) Date of Patent: Nov. 3, 2015

(54) POSITION-BASED CONTEXT AWARENESS FOR MOBILE TERMINAL DEVICE

(75) Inventors: Wolfgang Theimer, Bochum (DE); Dirk Gaschler, Wermelskirchen (DE); Reza Serafat, Bochum (DE); Thomas Schetelig, Bochum (DE); Andree Ross, Luenen (DE); Klaus Rateitschek, Herne (DE); Peter Weingart, Bochum (DE); Jari Saarhelo, Witten (DE); Sawako-Eeva Hayashi, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 1532 days.

(21) Appl. No.: 10/592,878

(22) PCT Filed: Mar. 18, 2004

(86) PCT No.: PCT/IB2004/000795
§ 371 (c)(1),
(2), (4) Date: Jun. 2, 2008

(87) PCT Pub. No.: WO2005/094109
PCT Pub. Date: Oct. 6, 2005

(65) Prior Publication Data
US 2008/0242418 A1   Oct. 2, 2008

(51) Int. Cl.
*H04W 24/00*   (2009.01)
*H04M 3/42*   (2006.01)
(Continued)

(52) U.S. Cl.
CPC ............... *H04L 67/26* (2013.01); *H04L 67/04* (2013.01); *H04L 67/18* (2013.01); *H04W 4/02* (2013.01)

(58) Field of Classification Search
CPC ... H04W 4/02; H04L 29/08657; A63F 13/12; A63F 13/00
USPC ............ 455/456.1, 456.3, 456.5, 456.6, 457, 455/414.1, 414.2, 414.3, 414.4; 463/1–5, 463/31
See application file for complete search history.

(56) References Cited

U.S. PATENT DOCUMENTS

| | | | |
|---|---|---|---|
| 2001/0054066 A1* | 12/2001 | Spitzer | 709/203 |
| 2002/0006818 A1* | 1/2002 | Suzuki | 463/7 |

(Continued)

FOREIGN PATENT DOCUMENTS

| | | |
|---|---|---|
| EP | 1102501 A2 | 5/2001 |
| EP | 1217857 A2 | 6/2002 |

(Continued)

*Primary Examiner* — Dung Hong
(74) *Attorney, Agent, or Firm* — Ditthavong & Steiner, P.C.

(57) ABSTRACT

The present invention relates to location/position-based context awareness for devices and mobile terminal devices, respectively. In particularly, the present invention relates to an infrastructure entity performing the location/position-based context awareness for a portable terminal device. According to the present invention an infrastructure entity and a method operable therewith for serving distance-dependent context information relating to a defined environment is provided. For instance, terminal/object distances are determined in accordance with a position of a portable terminal, each position of a plurality of objects and a position of an infrastructure entity, which is adapted to serve the aforementioned distance-dependent context information. Context information, which is associated with each of the plurality of object, is provided for being selected. Context information is selected from provided context information on the basis of the determined terminal/object distances. The selected context information is finally transmitted to the portable terminal for being processed thereon.

28 Claims, 5 Drawing Sheets

(51) Int. Cl.
*H04L 29/06* (2006.01)
*H04L 29/08* (2006.01)
*A63F 9/24* (2006.01)
*H04W 4/02* (2009.01)

(56) References Cited

U.S. PATENT DOCUMENTS

| | | |
|---|---|---|
| 2002/0077060 A1 | 6/2002 | Lehikoinen et al. |
| 2002/0090985 A1* | 7/2002 | Tochner et al. ............ 463/1 |
| 2003/0153330 A1 | 8/2003 | Naghian et al. |
| 2003/0153373 A1* | 8/2003 | Squibbs ..................... 463/1 |
| 2003/0218638 A1 | 11/2003 | Goose et al. |
| 2004/0110565 A1* | 6/2004 | Levesque ................. 463/42 |
| 2004/0248653 A1* | 12/2004 | Barros et al. ............. 463/43 |
| 2007/0225077 A1* | 9/2007 | Piccionelli .............. 463/42 |

FOREIGN PATENT DOCUMENTS

| | | |
|---|---|---|
| EP | 1361766 A2 | 11/2003 |
| FR | 2807900 A1 | 10/2001 |
| WO | WO0004730 A1 | 1/2000 |
| WO | WO03107708 A1 | 12/2003 |
| WO | WO2004004372 A1 | 1/2004 |

* cited by examiner

POSITION-BASED CONTEXT AWARENESS FOR MOBILE TERMINAL DEVICE

FIELD OF THE INVENTION

The present invention relates to location/position-based context awareness for a mobile terminal device. In particularly, the present invention relates to an infrastructure entity performing the location/position-based context awareness for a mobile or portable terminal device.

BACKGROUND

Today's portable terminal devices have limited input, output and storage capabilities, which directly limit the usability of such conventional portable terminal devices. Due to those limitations users are forced to handle such portable terminal device with more or less effort. Whereas the limitations in output and storage capabilities will be overcome by the implementation of currently available and future technical developments becoming standard, the limitation in the input capability is the most challenging task in the view of technical innovation and development. In particular, the overcoming of the limited input capability of the portable terminal devices is difficult due to the fact that the number of input means is bounded by dimension and weight of those terminal devices. Typically solutions, which are already developed for instance with respect to desktop terminal devices, cannot be migrated to the field of portable terminal devices due to the given boundaries of the portable terminal device such as those mentioned above.

Several concepts, which enable context awareness of portable terminal devices, are currently under development to simplify the handling of those devices having limited input capability. In principle, context awareness designates typically the tailoring of a user interface of a portable terminal device to currently present environmental conditions; i.e. the user interface of a portable terminal device can be automatically adapted to the environmental conditions by for example presenting available choices or choices possibly desired by the user.

Basically, two state of the art approaches for context awareness in the above-enlightened sense shall be presented. Portable terminal devices may implement context sensors such as position measuring sensors or other sensors for detecting physical context properties. On the basis of context information resulting from such sensors such portable terminal devices are able to react correspondingly. In the second approach several context providing (serving) entities distributed in the environment serve for providing context information to portable terminal devices adapted to acquire the context information therefrom; i.e. such portable terminal devices collect the context information and react thereto on the basis of an analysis of the collected context information.

Both presented approaches suffer from significant disadvantages relating to costs, scaling, flexibility and configurability. In detail, in accordance with the first approach, portable terminal devices implementing sensors for detecting and sensing context information requires supplementary information to be retrieved since the sensed information is typically not sufficient for an adequate reaction of such portable terminal devices. However, the retrieving of such supplementary information on the basis of the sensed context information is problematic or even impossible, when considering that all supplementary information should be stored centrally in view of usability aspects. The distributed provision of the context information as purposed with the second approach overcomes the disadvantage of the first approach, but the provision and the maintenance of context providing entities is expensive and elaborate. Moreover, the specific provision of context providing entities dedicated for pre-defined purposes lack in flexibility and configurability.

SUMMARY

The overall object of the present invention is to improve the presently available concepts of context awareness and to overcome the aforementioned disadvantages of those known concepts.

In detail, an object of the present invention is to provide local context information in a flexible and scalable manner with the possibility of centralized administration of the context information.

Another object of the present invention is to provide infrastructure elements serving for a plurality of different context information to be utilized by portable terminal devices for context awareness.

Another object of the present invention is to provide a system comprising several infrastructure elements and a plurality of portable terminal devices.

According to a first aspect of the present invention, a method for serving context information is provided. At least a position of the portable terminal and a mobile terminal is determined, respectively. Preferably, the infrastructure entity is provided to determine the position. Context information is selected from provided context information on the basis of the determined position and the selected context information is transmitted to the portable terminal for being processed thereon.

Preferably a defined environment is provided. An infrastructure entity serves the context information to a portable terminal being located within a coverage area of the infrastructure entity. The context information is associated with the defined environment, which can be constituted by a real-world environment, a virtual world environment or an augmented environment, which is combined of a real-world environment and a virtual environment.

Conclusively, the context information is associated to the defined environment. The defined environment is designed, constructed, set-up etc such that the context awareness of the portable terminal is determinable and controllable on the basis of a structure of the defined environment, respectively. The defined environment serves to map the individual context information, which is operable with the context awareness of the portable terminal in question, to a position-dependent frame of reference relating to the context information.

According to another embodiment of the present invention, the position of the portable terminal may be obtained with the help of terminal-based position technology or network-based position technology. The positions of the objects are preferably pre-configured.

According to another embodiment of the present invention, a plurality of objects is provided and each object is associated with the context information. Moreover, the objects are associated with positions, which are defined on the basis of the defined environment, which forms a reference area or reference space.

According to another embodiment of the present invention, terminal/object distances are determined on the basis of the positions of the portable terminal and the objects. Preferably, the infrastructure entity is provided to determine the terminal/object distances, wherein each position of the plurality of objects, the position of the portable terminal and a position of the infrastructure entity may be taken into consideration for the determination of the terminal/object distances. Context information is selected from provided context information on the basis of the determined terminal/object distances and the selected context information is finally transmitted to the portable terminal for being processed thereon.

It shall be noted that the defined environment is constituted as a real-world environment, a virtual environment and/or an augmented environment. Accordingly, the positions and/or distances, on the basis of which the context information is selected, may have to be transposed and mapped into a reference area (and reference space, respectively), which allows for determining suitable quantities. This means, the positions and/or distances may have to be transposed into the reference space of the defined environment to enable the selection of the context information associated with the defined environment in accordance with the terminal/object distances and/or positions. Vice versa, quantities defined in the reference space of the defined environment may be transposed to the reference space of the positions and/or distances.

According to an embodiment of the present invention, the position of the portable terminal and the positions of the plurality of objects can vary in time. This means, the positions may be static corresponding to a stationary portable terminal and objects, respectively, or the positions may be dynamic corresponding to a moving portable terminal and objects, respectively.

According to yet another embodiment of the present invention, the terminal/object distances can be determined at a point in time; or the terminal/object distances can be determined for a period of time. The point in time is preferably a current point in time, whereas the period of time may extend into future. A period of time extending into future allows a prediction of terminal/object distances at a future point in time.

According to a supplementary embodiment of the present invention, each terminal/object distance represent a distance between the position of the portable terminal and a position of an object of the plurality of objects; a distance between the position of the portable terminal and the position of the infrastructure entity; or any combination thereof.

According to a further embodiment of the present invention, contents of the context information associated with at least one of the plurality of objects are depending on the corresponding terminal/object distance. The context information associated with a distinct object may comprise individual context information each being assigned to a (pre-) defined distance, range of distance etc.

According to yet a further embodiment of the present invention, the coverage area provided defines the area, within which transmissions to the portable terminal are operable. The coverage area differs in general and in principle from the defined environment. Nevertheless, the coverage area, which is necessarily a real-world area, space, region etc, may be part of the defined environment.

According to an embodiment of the present invention, the context information may comprise information and data of arbitrate contents. In particular, the context information may comprise information and data to be displayed to a user of the portable terminal; information and data for being processed by the portable terminal; and/or instructions commanding the portable terminal to operate correspondingly.

According to another embodiment of the present invention, the defined environment is mapped to a digital representation of the defined environment, wherein the plurality of objects is part of the digital representation.

According to yet another embodiment of the present invention, one or more objects represent physical objects, which are present within the defined environment. The one or more objects serve to map the physical objects to the digital representation of the defined environment.

According to a further embodiment of the present invention, one or more objects represent virtual objects. Virtual objects are part of the digital representation of the defined environment but must not have any correspondence in the original defined environment. The combination of objects representing physical objects and objects being virtual objects forms an augmented environment.

According to a second aspect of the present invention, computer program product for executing a method for serving context information relating to a defined environment is provided. The computer program product comprises program code sections for carrying out the steps of the method according to an aforementioned embodiment of the invention, when the program is run on a computer, a terminal, a network device, a mobile terminal, a portable terminal, a mobile communication enabled terminal or an application specific integrated circuit. Alternatively, an application specific integrated circuit (ASIC) may implement one or more instructions that are adapted to realize the aforementioned steps of the method of an aforementioned embodiment of the invention, i.e. equivalent with the aforementioned computer program product.

According to a third aspect of the present invention, a computer program product is provided, which comprises program code sections stored on a machine-readable medium for carrying out the steps of the method according to an aforementioned embodiment of the invention, when the computer program product is run on a computer, a terminal, a network device, a portable terminal, a mobile terminal, or a mobile communication enabled terminal.

According to a fourth aspect of the present invention, a software tool is provided. The software tool comprises program portions for carrying out the operations of the aforementioned methods when the software tool is implemented in a computer program and/or executed According to a fifth aspect of the present invention, a computer data signal embodied in a carrier wave and representing instructions is provided which when executed by a processor cause the steps of the method according to an aforementioned embodiment of the invention to be carried out.

According to a sixth aspect of the present invention, an infrastructure entity adapted for serving context information relating to a defined environment is provided. The Infrastructure entity comprises at least an information storage calculation means, selection means and a wireless data interface, which is operable with a coverage area for data communication with a portable terminal being located in the coverage area. The information storage is adapted to store context information, which is associated with the defined environment. The calculation means is adapted to determine at least a position of a portable terminal. Preferably, a position of the infrastructure entity is taken into account for determining the position of the portable terminal. The selection means is adapted for selecting the context information in accordance with the determined position. The selected context information is transmitted via the wireless data interface to the portable terminal for being processed thereon.

According to an embodiment of the present invention, a plurality of objects is provided and each object is associated with the context information. Moreover, the objects are associated with positions, which are defined on the basis of the defined environment, which forms a reference area or reference space.

According to another embodiment of the present invention, the calculation means is adapted to determine terminal/object distances on the basis of positions including positions of the portable terminal, the objects and the infrastructure entity (if required), respectively. By the means of the selection means, the context information is selected from the provided and stored context information in accordance with the terminal/object distances determined.

According to another embodiment of the present invention, the calculation means is further adapted to determine the terminal/object distances at a point in time and to determine the terminal/object distances for a period of time.

According to another embodiment of the present invention, the calculation means is adapted to determine the terminal/object distances between the position of the portable terminal and each position of the plurality of objects; and to determine the terminal/object distances between the position of the portable terminal and the position of the infrastructure entity.

According to yet another embodiment of the present invention, contents of the context information associated with at least one of the plurality of objects are depending on the corresponding terminal/object distance. Hence different contexts may be selected based upon different distances.

According to a further embodiment of the present invention, the wireless data interface is operable for transmitting to the portable terminal within a coverage area, which differs from the defined environment.

According to yet a further embodiment of the present invention, the infrastructure entity further comprises a digital representation of the defined environment or the defined environment corresponds to a digital representation. The digital representation may be obtainable for a mapping of the defined environment to the digital representation. The digital representation further comprises the aforementioned objects. Each object represents either a physical object or a virtual object. The physical object is present in the defined environment, whereas the virtual object may not have a physical correspondence.

According to a seventh aspect of the present invention, a system for serving context information is provided. The system comprises a plurality of infrastructure entities and at least one portable terminal. The infrastructure entities are each adapted for serving context information within a respective individually defined environment and each infrastructure entity corresponds to an aforementioned infrastructure entity according to an embodiment of the present invention. The portable terminal comprises at least a wireless data interface, which is adapted for data communication with the infrastructure entities.

According to an embodiment of the present invention, the individually defined environments of the infrastructure entities overlap.

According to another embodiment of the present invention, the system comprises additionally a central server, which is adapted to allow administration of objects and context information comprised by the infrastructure elements.

BRIEF DESCRIPTION OF THE DRAWINGS

In the following, the present invention will be described in greater detail with reference to embodiments and the accompanying drawings, in which.

DETAILED DESCRIPTION OF EMBODIMENTS OF THE INVENTION

Figure 1A:
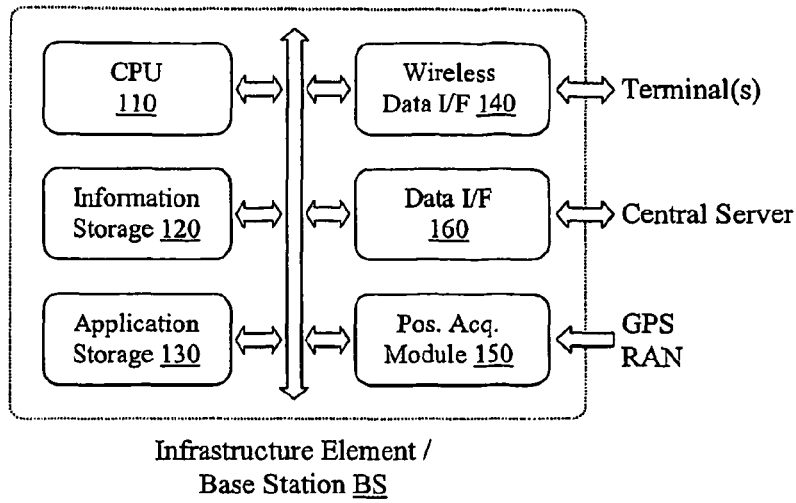
FIG. 1a illustrates schematically the structure of an infrastructure element according to an embodiment of the present invention.

Throughout the detailed description and the accompanying drawings same or similar components, units or devices will be referenced by same reference numerals for clarity purposes.

Figure 1B:
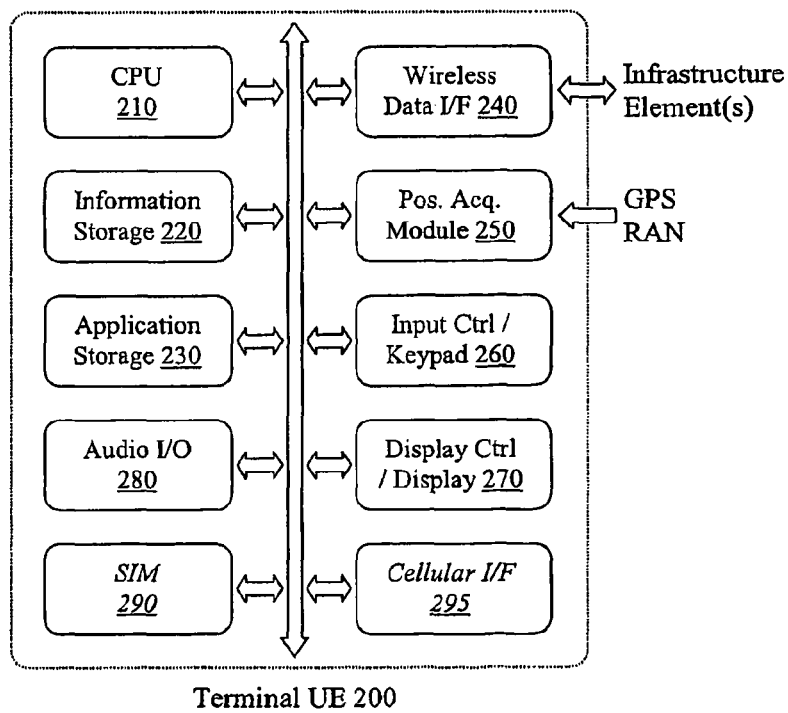
FIG. 1b illustrates schematically the structure of a portable terminal according to an embodiment of the present invention.

FIG. 1a and FIG. 1b relates to the implementation of the infrastructure element and the portable terminal according to embodiments of the present invention. It shall be noted that the designations portable terminal (device) and mobile terminal (device) are used synonymously throughout the description.

With reference to FIG. 1a, the infrastructure element, which will be also designated as base station By in the following, shall be implemented on the basis of a processor-based electronic device, which comprises typically a central processing unit (CPU) 110, an information storage 120, an application storage 130. In accordance with the present inventive concept, the infrastructure element BS further includes a wireless data interface (I/F) 140, which is adapted for wireless data communication with one or more portable terminals UE, an optional data interface (I/F) 160, which is adapted for communicating with a central server, and an optional position acquisition module 150 for determining the actual location/position of the infrastructure element BS.

The wireless data interface (I/F) 140 may be operated on the basis off any available or future technology/standard for wireless data communications. In particular, the wireless data interface (I/F) 140 may operate on the basis of electromagnetic/electrostatic technology, which allows to emit radio frequency signals and detect such radio frequency signals, which carry data to be exchanged between at least two spaced wireless data interface (I/F). More particular, the wireless data interface (I/F) 140 may be constituted by a local data communications interface such as a Bluetooth data interface, a wireless local area network (WLAN) interface, a near-field communication (NFC) interface, a wireless local loop (WLL) interface, ultra-wide band (UWB) interface, any other interface operable with IEEE 802.xx standards, a digital enhanced cordless telephone (DECT) interface or any similar/related communications standard allowing wireless data communications. Additionally, the wireless data interface may be an infrared-based data interface such as defined by the infrared data access (IrDA) standard. Moreover, the wireless data interface (I/F) 140 may be also realized by a cellular interface according to the GSM (global system for mobile communications) standard, the UMTS (universal mobile telecommunication services) standard, the PCS (personal communication system) standard, IS-95 standard, IS-139 standard, IS-2000 standard or any other available/future standard for cellular communications.

The data interface (I/F) 160 may be constituted by any wire-based or wireless data interface, which allows data communications with the central server responsible for instance for centralized administration of the one or more infrastructure elements and the information stored therein. The centralized administration may include centralized configuration, centralized maintenance, centralized updating etc primarily relating to the information stored in the one or more infrastructure elements. Typical wireless data communications technologies have been described with respect to the wireless data interface (I/F) 140. These wireless data communications technologies may also be utilized by the data interface (I/F) 160. Additionally, the data interface (I/F) 160 may further be based on wire-based data communications technologies such as local area network (LAN), wide area network (WAN), serial data communication such as IEEE 232, universal serial bus (USB), Firewire etc, parallel data communication such as Centronics, IEEE 1284, etc standards. The designation wire-based data communications shall cover dada communications over electrical wires and/or over optical fibers.

The position acquisition (Pos. Acq.) module 150 serves to determine a location/position information, preferably a geographical position information, on the basis of which a relative or absolute geographical position of the infrastructure element is determinable. Different technologies are available for determining a geographical position information. The most common position/location technology is based on the global positioning system (GPS), in the context of which a fleet of satellites orbiting the earth emits radio frequency signals, on the basis of which a GPS receiver module is capable to compute an absolute geographical position. A position/location technology with increasing interest is based on cellular communications technology. In the field of cellular communications technology several different methods are applicable for determining at least a position/location information relative to one or more base stations. Due to the fact that the geographical positions of the base stations are known, an absolute geographical position can be obtained by a portable terminal capable for cellular communications. The precision of the obtained geographical position depends on the applied method and the cell size of the base station used for determining the position/location. The method for determining a position of a cellular terminal are for instance known as received signal levels, time advance (TA), round trip time (RTT), time of arrival (TOA), enhanced observed time difference (E-OTD) and observed time difference of arrival-idle period down link (OTDOA-IPDL). Additionally, GPS-assisted triangulation can be used, which is a mix of network-based position technology (such as position/location technology in the cellular domain) and terminal-based position technology (e.g. GPS). It should be also noted that the position/location technologies in the cellular domain could be likewise implemented in any other field of wireless data communications for serving network-based position/location information. The detailed operation and implementation of the employed position/location technology is out of the scope of the present invention, which shall not limited to any specific position/location technology such as the aforementioned technologies.

The information storage 120 primarily stores context information, which is to be provided to the portable terminals UE being connected via the wireless data interface (I/F) 140 to the infrastructure element BS.

Figure 2:
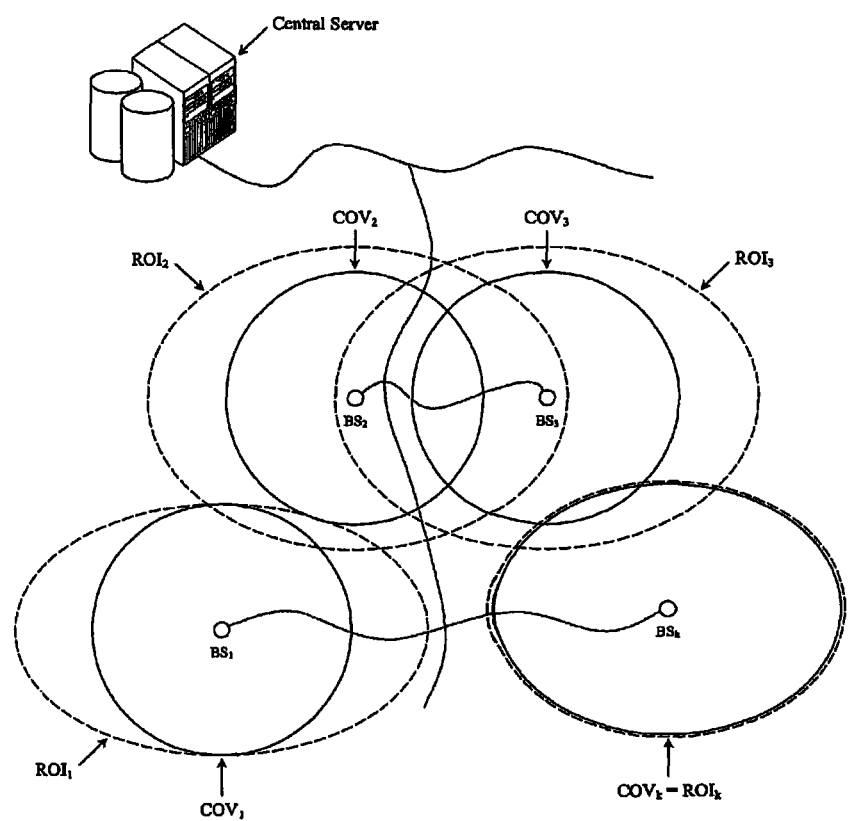
FIG. 2 illustrates schematically an example arrangement of several infrastructure elements according to an embodiment of the present invention.

The operation of the infrastructure element BS will become apparent when reading the description referring to FIG. 2 and following figures.

With reference to FIG. 1b, the portable terminal 200 according to an embodiment of the invention shall be implemented on the basis of a processor-based portable terminal device, which comprises typically a central processing unit (CPU) 210, an information storage 220, an application storage 230 and input/output means including audio input/output (I/O) means 280, a keypad with input controller (Ctrl) 260 and a display with display controller (Ctrl) 270.

The portable terminal 200 is further equipped with a wireless data interface (I/F) 240, which corresponds to the wireless data interface (I/F) 140 of the infrastructure element BS to allow wireless data communications therewith. Additionally, the portable terminal 200 may equipped with an optional position acquisition (Pos. Acq.) module 250 to allow determination of position information relating to the current location/position of the portable terminal. The detailed description given with respect to the wireless data interface (I/F) 140 and the position acquisition module 150 illustrated in FIG. 1a is also applicable to the wireless data interface (I/F) 240 and the position acquisition module 250 of the portable terminal 200 according to an embodiment of the present invention, respectively.

Moreover, the illustrated portable terminal 200 may include a subscriber identification module (SIM) 290 and a cellular interface (I/F) 295 which enables the portable terminal 200 for cellular communications. In detail, the cellular interface (I/F) 295 coupled to a cellular antenna (not shown) provides for an over-the-air interface, which serves in conjunction with the subscriber identification module (SIM) 290 for cellular communications with a corresponding radio access network (RAN) of a public land mobile network (PLMN). It shall be understood that the capability for cellular communications is widely spread in the field of portable terminals. Nevertheless, the present invention shall not be understood as limited to portable terminals capable for cellular communications.

The display and display controller (Ctrl) 270 are controlled by the central processing unit (CPU) 210 and provides information for the user typically by the means of a user interface. The keypad and keypad controller (Ctrl) 260 are provided to allow the user to input information. The information input via the keypad is supplied to the central processing unit (CPU) 210, which may be controlled in accordance with the input information. The audio input/output (I/O) means 280 includes at least a speaker for reproducing an audio signal and a microphone for recording an audio signal. The central processing unit (CPU) 210 may control the conversion of audio data to audio output signals and the conversion of audio input signals into audio data, where the audio data have suitable format for cellular transmission.

The portable terminal 200 may be handled and controlled by a user with the help of a user interface, which presents information to the user and allows selection of functions provided by the portable terminal 200 to the user. The user interface is primarily controlled by user inputs via the keypad and keypad controller (Ctrl) 260. In accordance with the inventive concept of the present invention, the user interface, i.e. the presentation of information to the user and the provision of functions of the portable terminal 200 selectable by the user, is likewise controlled by context information received via the wireless data interface (I/F) 240. This operational concept of the portable terminal 200 will become apparent when reading the description referring to FIG. 2 and following figures.

FIG. 2 illustrates schematically an example arrangement of several infrastructure elements according to an embodiment of the present invention in a first overall perspective.

In detail, FIG. 2 depicts a schematic map showing an example selection of four infrastructure elements $BS_1$ to $BS_k$. The illustrated infrastructure elements shall represent any arrangement of one or more infrastructure elements $BS_k$. Each infrastructure element $BS_1$ to $BS_k$ is associated with a coverage area $COV_1$ to $COV_k$, the illustrated border of which represents the maximal transmission distance, over which data communication via the wireless data interfaces (I/F) 140 and 240 is obtainable, respectively. The dimension and shape of each coverage area $COV_1$ to $COV_k$ may differ due to environmental influences and effects as well as physical properties of the wireless data interface (I/F) 140 used in the different infrastructure elements $BS_1$ to $BS_k$. Additionally, each infrastructure element $BS_1$ to $BS_k$ is associated with a region of interest $ROI_1$ to $ROI_k$, the illustrated border of which represents the maximal distance, within which context information are supported and administrated by the respective infrastructure element $BS_1$ to $BS_k$. The dimension and shape of each region of interest $ROI_1$ to $ROI_k$ may differ. An region of interest region of interest $ROI_1$ to $ROI_k$ can but must not have a dimension and size larger than the corresponding coverage area $COV_1$ to $COV_k$. In particular, different sizes and shapes of the coverage area COV and the region of interest ROI are illustrated with respect to the infrastructure element $BS_1$ and the infrastructure element $BS_k$.

The schematic map of FIG. 2 illustrates also the physical arrangement of the infrastructure elements $BS_1$ to $BS_k$ within the space, i.e. herein on a two-dimensional plane. As illustrated, the coverage areas COV and/or region of interest ROI may or may not overlap at different extents. For the way of illustration, the coverage areas $COV_1$ and $COV_2$ of the infrastructure elements $BS_1$ and $BS_2$ do not overlap, while their respective regions of interest $ROI_1$ and $ROI_2$ overlap. Further, both the coverage areas $COV_2$ and $COV_3$ and the regions of interest $ROI_2$ and $ROI_3$ of the infrastructure elements $BS_2$ and $BS_3$ overlap at a great extent. Finally, the coverage areas $COV_3$ and $COV_k$ of the infrastructure elements $BS_3$ and $BS_k$ overlap at a smaller extend while their respective regions of interest $ROI_3$ and $ROI_3$ of the infrastructure elements $BS_2$ and $BS_3$ overlap at a greater extent.

Further, the infrastructure elements $BS_1$ and $BS_k$ may be connected to a central server. Correspondingly, FIG. 2 shows schematically a wire-based data communication connection between infrastructure elements $BS_1$ and $BS_k$ and central server, which may represent a typical LAN (local area network) or WAN (wide area network).

It shall be understood by those skilled in the art that the physical arrangement of infrastructure elements in space according to an embodiment of the invention depends on the application, for which the infrastructure elements are dedicated. Application examples and use cases are described below in detail.

As aforementioned, each infrastructure elements handles and serves context information, which shall be associated with objects each having a defined position in the three-dimensional or two-dimensional space. The position may be variable in time. The objects may represent digital representations of physical objects or digital representation of virtual objects. A physical object is a real-world object, whereas a virtual object may have no physical representation in the real world.

Each infrastructure element maps a defined environment (region of interest ROI) thereof to a digital representation. Context information is provided for being served to the portable terminals in conjunction with the defined environment. The context information is associated with a defined position within the defined environment, wherein the context information is part of the digital representation of the mapped environment. The context information with a defined position will be described as an object having a position within the mapped environment, which is associated with the context information. The digital representation of the mapped environment allows handle physical objects being part of the defined environment and virtual objects having no physical correspondence and appearance in the real world, respectively.

Figure 3A:
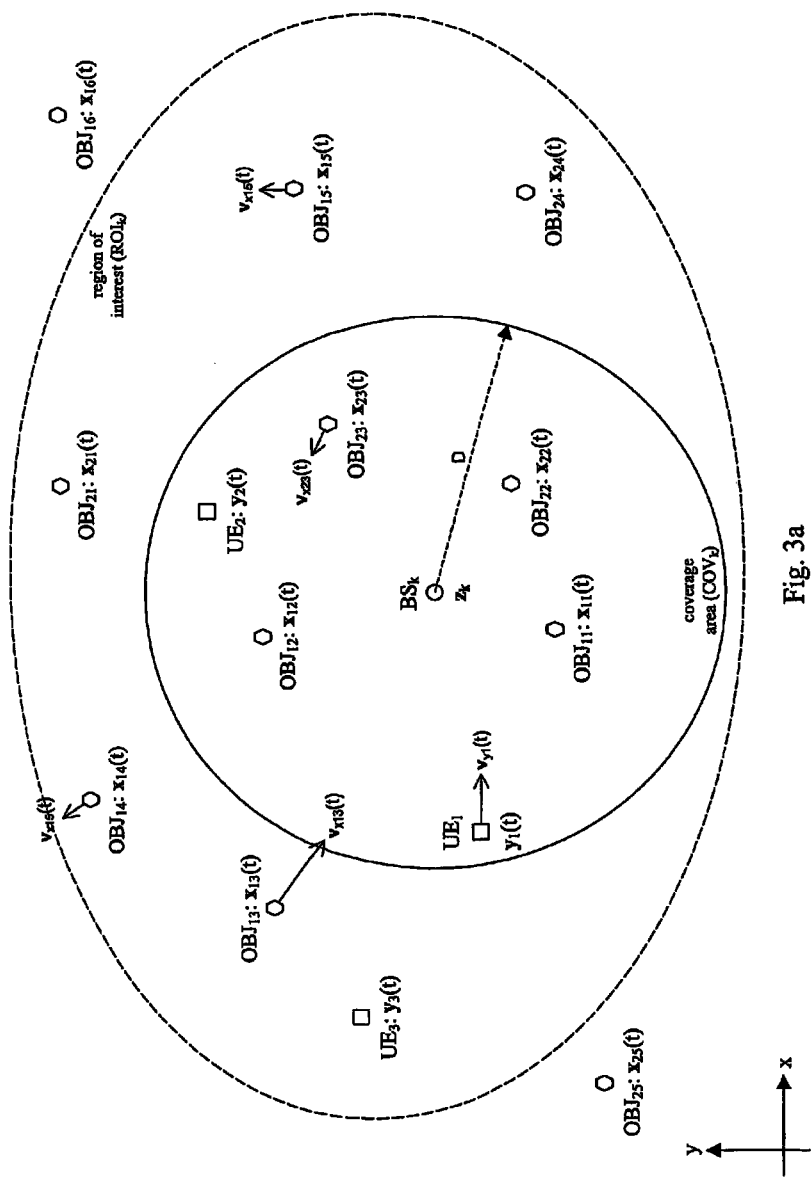
FIG. 3a illustrates schematically a detailed graph of physical/virtual objets relevant for the operation of an infrastructure element according to an embodiment of the present invention.

FIG. 3a illustrates snapshot of an example arrangement comprising an infrastructure element $BS_k$, a plurality of objects $OBJ_{ij}$ and several portable terminals $UE_i$. The illustrated objects $OBJ_{ij}$ and portable terminals $UE_i$ shall represent an arbitrary number of objects $OBJ_{ij}$ and an arbitrary number of portable terminals $UE_i$, respectively. As mentioned above specific and individual context information is associated with each object $OBJ_{ij}$, which in turn has a well-defined position in space. Consequently, the objects $OBJ_{ij}$ can be described by the means of vectorial values $x_{ij}$ (i.e. space vectors) representing the position in space and representing the position in mapped space, respectively. Correspondingly, bold-styled typing indicates the vectorial position properties $x_{ij}$ of the depicted objects $OBJ_{ij}$. The same applies to the illustrated portable terminals $UE_i$, which positions are denoted as vectorial values $y_i$.

In accordance with the description above, the infrastructure element $BS_k$ and the wireless data interface (I/F) 140 thereof has a determined coverage area $COV_k$, respectively. For the sake of simplicity, the maximal transmission distance of the infrastructure element $BS_k$ and the wireless data interface (I/F) 140 thereof may be defined by the illustrated distance D, respectively. Further, the infrastructure element $BS_k$ has assigned a predefined region of interest $ROI_k$. Objects $OBJ_{ij}$, which are within the predefined region of interest $ROI_k$, and context information thereof are handled and administrated by the infrastructure element $BS_k$, respectively; i.e. the infrastructure element $BS_k$ is able to provide context information associated with the objects $OBJ_{ij}$, which are within the predefined region of interest $ROI_k$. For the way of illustration, objects $OBJ_{25}$ and $OBJ_{16}$ are included in the map graph of FIG. 3a at their positions $x_{25}$ and $x_{16}$, respectively. In accordance with the above described conditions, both the object $OBJ_{25}$ and the object $OBJ_{16}$ (and their associated context information, respectively) will not be handled and administrated by the infrastructure element $BS_k$ because these objects $OBJ_{25}$ and $OBJ_{16}$ are situated outside the boundary of the region of interest $ROI_k$.

Further, the positions of the objects $OBJ_{ij}$ may vary in time; i.e. the position $x_{ij}$ of the objects $OBJ_{ij}$ can be denoted as a function of time; i.e. $x_{ij}=x_{ij}(t)$. Finally, the positions $x_{ij}$ of the objects $OBJ_{ij}$ may be denoted mathematically as following:

$OBJ_{ij}:x_{ij}(t)=(x_{ij}(t);y_{ij}(t);z_{ij}(t))^T$, where a three-dimensional space is assumed and $OBJ_{ij}:x_{ij}(t)=(x_{ij}(t);y_{ij}(t))^T$, where a two-dimensional space is assumed.

The same applies to the position $y_i$ of the portable terminals $UE_i$:

$UE_i:y_i(t)=(x_i(t);y_i(t);z_i(t))^T$, where a three-dimensional space is assumed and $UE_i:y_i(t)=(x_i(t);y_i(t))^T$, where a two-dimensional space is assumed.

FIG. 3a depicts a snapshot in time of the depicted objects $OBJ_{ij}$ and portable terminals $UE_i$. Beside their positions $x_{ij}(t)$ and $y_i(t)$, their current movements are indicated by associated velocity vectors $v_{xij}(t)$ and $v_{yi}(t)$, respectively, which represent their current velocities (in case the object and portable terminal is not stationary in the moment, respectively).

Additionally, each portable terminal $UE_i$ may have assigned its own set of $n_i$ objects $OBJ_{ij}$, where $j \in [1, n_i]$. This means, index i in the denotation of the objects $OBJ_{ij}$ refers to the i-th portable terminal $UE_i$. Correspondingly, the set of $n_1$ illustrated objects $OBJ_{ij}$ are assigned to the portable terminal $UE_1$ and the set of $n_2$ illustrated objects $OBJ_{2j}$ are assigned to the portable terminal $UE_2$. It shall be noted that the same set of objects $OBJ_{ij}$ may be assigned to the portable terminals $UE_i$; i.e. $OBJ_{ij}=OBJ_j$, $\forall i$, where $j \in [1, n]$.

As soon as a portable terminal $UE_i$ enters the coverage area $COV_k$ of the infrastructure element $BS_k$, data communication between the portable terminal $UE_i$ and the infrastructure element $BS_k$ can be established. The portable terminal $UE_i$ may automatically subscribe to the service of the infrastructure element $BS_k$ when entering the coverage area $COV_k$, or the user may manually set up/acknowledge the subscription to the service of the infrastructure element $BS_k$. Mathematically, following condition have to be satisfied to enable data communications between infrastructure element $BS_k$ and portable terminal $UE_i$:

$$\|z_k - y_i(t)\| = d_{yi} < D,$$

where $z_k$ is the position of the infrastructure element $BS_k$; $y_i$ is the position of the portable terminal $UE_i$; $d_{yi}$ is the resultant distance between infrastructure element $BS_k$ and portable terminal $UE_i$; and D is the maximal transmission distance of the infrastructure element $BS_k$ and the wireless data interface (I/F) included therein, respectively.

With respect to FIG. 3a, the condition denoted above is satisfied for portable terminal $UE_1$ and portable terminal $UE_2$, whereas portable terminal $UE_3$ is out of the transmission range of the infrastructure element $BS_k$.

Although, objects $OBJ_{ij}$ and context information associated thereto have been defined and described, those skilled in the art will appreciate on the basis of the description, that context information itself can be comprehended as identical with those above-described objects $OBJ_{ij}$. Moreover, the positions $x_{ij}$ of the objects $OBJ_{ij}$ can be regarded as position parameters and position properties of the context information, respectively.

Figure 3B:
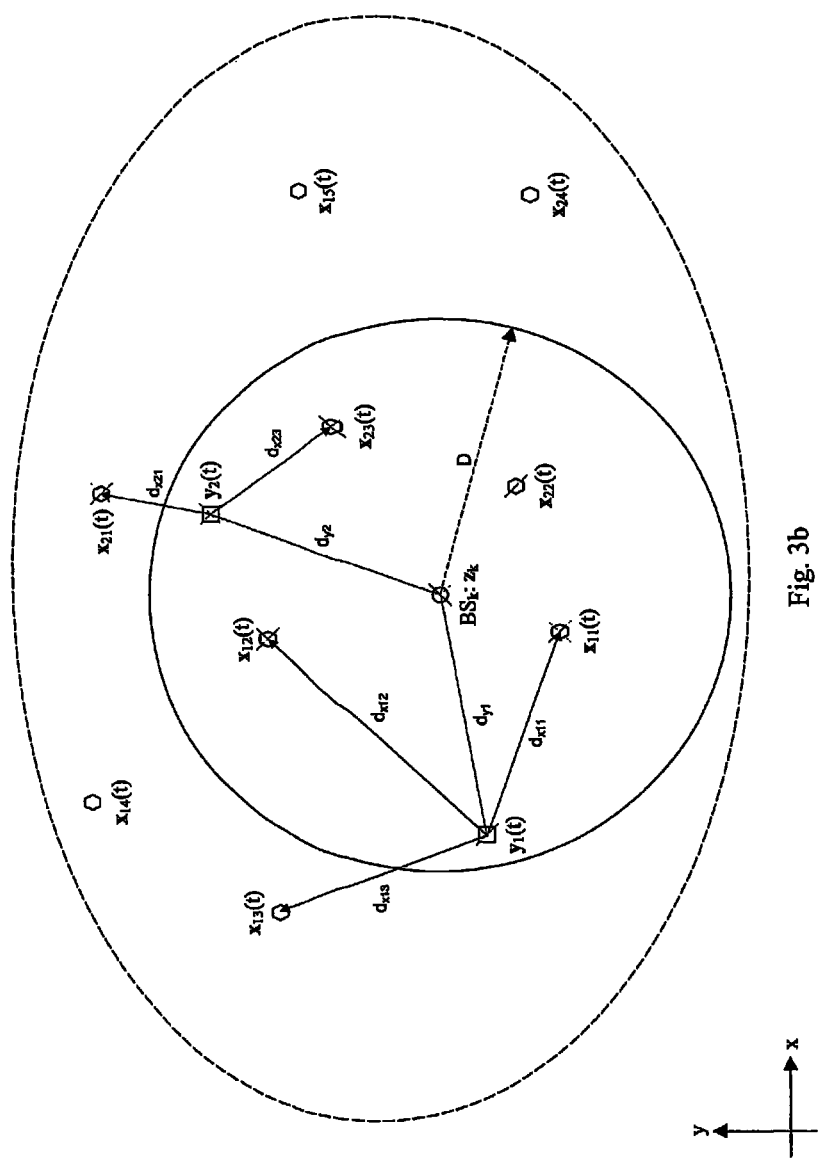
FIG. 3b illustrates schematically a further detailed graph essentially corresponding to FIG. 3a and including supplementary quantity information according to an embodiment of the present invention.

Referring now to FIG. 3b, which essentially corresponds to FIG. 3a, further geometric quantities, which are relevant for the inventive concept, are schematically illustrated in addition to the map graph of the objects $OBJ_{ij}$, portable terminals UE, and infrastructure element $BS_k$. As aforementioned, the portable terminal $UE_1$ and $UE_2$ are within the coverage area $COV_k$ of the infrastructure element $BS_k$ such that the infrastructure element $BS_k$ is capable to server context information to the portable terminal $UE_1$ and $UE_2$.

Beside the distances $d_{yi}$ (i.e. distance between portable terminal $UE_i$ and infrastructure element $BS_k$) distances $d_{xij}$ between portable terminal $UE_i$ and the respective objects $OBJ_{ij}$ are of interest. Mathematically, the distances $d_{ij}$ can be denoted as following:

$$\|x_{ij} - y_i(t)\| = d_{xij},$$

where $x_{ij}$ corresponds to the position of the objects $OBJ_{ij}$ and $y_i$ corresponds to the position of the portable terminal $UE_i$.

In a more general embodiment, the region of interest $ROI_k$ associated with an infrastructure element $BS_k$ spans a reference area and a frame of reference, respectively. The reference area shall constitute a two-dimensional or a three-dimensional reference space, with reference to which the objects $OBJ_{ij}$ are defined; i.e. the space defined by the region of interest serves as the frame of reference for the positions of the objects $OBJ_{ij}$. Consequently, the coverage area $COV_k$, which represents a real-world quantity, defines the real-world space, within which communication between the infrastructure element $BS_k$ and the portable terminal $UE_i$ is achievable. This means, the coverage area $COV_k$ and the region of interest $ROI_k$ form in a general embodiment completely separate and distinct reference spaces (areas), which can overlap, which can be equal or which are just such distinct as aforementioned. A complete separation of the region of interest $ROI_k$ and the coverage area $COV_k$ is illustrated with reference to a use case described below.

With reference to the general embodiment described above, the regions of interest ROI, which span a reference area (reference space) and a frame of reference, respectively, include that positions of the objects OBJ, the infrastructure elements BS and/or the portable terminals UE are mapped/transposed to the regions of interest ROI as required. This means for instance that positions of the portable terminals UE and the infrastructure elements BS are mapped/transposed to the frame of reference in which the objects OBJ and their positions are defined. Vice versa, the positions of the objects OBJ may be alternatively mapped/transposed to the frame of reference in which the positions of the portable terminals UE and the infrastructure elements BS are defined. Analogously, distances relating to objects $d_{xij}$ and portable terminals $d_{yi}$ are handled likewise, i.e. are mapped to the frame of reference of the regions of interest ROI and the frame of reference fixed for instance by the infrastructure elements BS.

Figure 4:
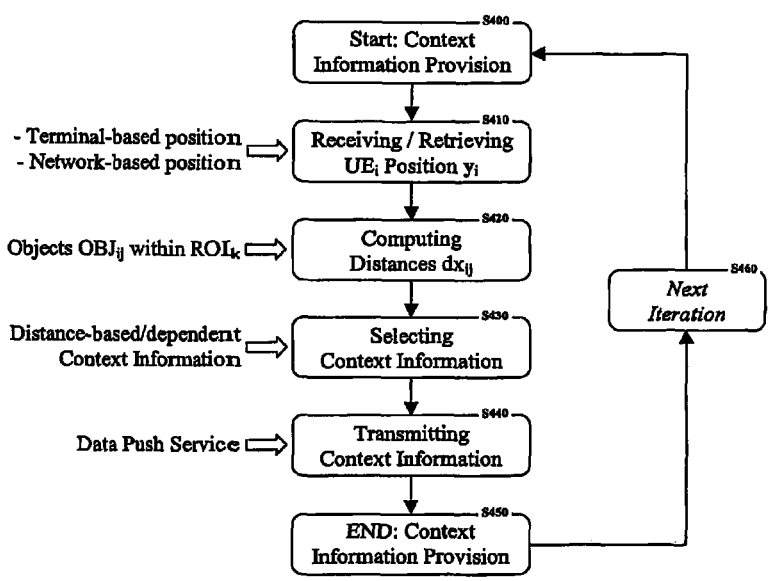
FIG. 4 depicts a flow chart illustrating a basic operational sequence to be operated by an infrastructure element according to an embodiment of the present invention.

FIG. 4 depicts a flow chart illustrating a basic operational sequence to be operated by an infrastructure element $BS_k$ according to an embodiment of the present invention. The application of the aforementioned described calculation of the distances $d_{xij}$ will become more apparent with regard to the following description.

In an operation S400, the context information provision starts. The operational sequence according to an embodiment of the present invention is to be performed by an infrastructure element such as the infrastructure element $BS_k$ described above.

It shall be assumed that the infrastructure element $BS_k$ is in knowledge about its own position $z_k$. Due to the fact that the infrastructure element $BS_k$ is conventionally arranged at a certain position $z_k$, i.e. stationary in space ($z_k \neq z_k(t)$), the position may be configured once, for instance at the moment of putting up and putting into operation, respectively. The required information about the position $z_k$ of the infrastructure element $BS_k$ may be obtained by global position system (GPS) receiver, a differential global position system (DGPS) receiver etc. In case the infrastructure element $BS_k$ is embodied as a portable infrastructure element $BS_k$, i.e. moveable in space ($z_k = z_k(t)$), a position acquisition module included in or coupled to the portable infrastructure element $BS_k$ can be useful, in order to prevent numerous configuration operations each time the portable infrastructure element $BS_k$ is moved in its position.

In an operation S410, the current position of the portable terminals $UE_i$ is determined or received. The infrastructure element $BS_k$ serves the context information service for portable terminals $UE_i$, which are subscribed to the context information service of the infrastructure element $BS_k$ and which are currently situated within the coverage area $COV_k$ of the infrastructure element $BS_k$ (with reference back to FIG. 3a and FIG. 3b the portable terminals $UE_1$ and $UE_2$).

As aforementioned and depending on the used position/location technology, the determination of the position is either network-based or terminal-based. Depending on the employed position/location technology, the required information about the positions $y_i$ of the portable terminals $UE_i$ in question is either present at the portable terminals $UE_i$ or is available at the infrastructure element $BS_k$. Accordingly, the portable terminals $UE_i$ may push the required information about their positions $y_i$ to the infrastructure element $BS_k$, the portable terminals $UE_i$ may transmit the required information about their positions $y_i$ to the infrastructure element $BS_k$ in response to requests transmitted before from the infrastructure element $BS_k$ to the portable terminals $UE_i$ or the infrastructure element $BS_k$ may retrieve the information about the positions $y_i$ of the portable terminals $UE_i$ in question from a position storage such as a position database, which may also be an external entity serving position information.

In an operation S420, the object-terminal distances $d_{xij}$ between the positions $x_{ij}$ of the objects $OBJ_{ij}$ and positions $y_i$ of the portable terminals $UE_i$ are determined. The distances $d_{xij}$ may be determined at a current point in time reflecting a snapshot of the current arrangement of the objects $OBJ_{ij}$ and portable terminals $UE_i$ at the current point in time. Alternatively or additionally, the distances $d_{xij}$ may be determined for a period in time, especially a period, which extents into future. On the basis of such distances $d_{xij}$ predictions about the arrangement of the objects $OBJ_{ij}$ and portable terminals $UE_i$ to be expected can be concluded.

The required and relevant information about the position $x_{ij}$ of the objects $OBJ_{ij}$ being arranged within the region of interest $ROI_k$ of the infrastructure element $BS_k$ is primarily administrated by the respective infrastructure element $BS_k$; i.e. the infrastructure element $BS_k$ handles, maintains, updates, configures and serves all information associated with the objects $OBJ_{ij}$.

Alternatively or additionally, the terminal distances $d_{yi}$ between the positions $y_i$ of the portable terminals $UE_i$ and the infrastructure element $BS_k$ are determined. Analogously, The distances $d_{yi}$ may be determined at a current point in time reflecting a snapshot of the current arrangement of the portable terminals $UE_i$ at the current point in time. Further analogously, the distances $d_{yi}$ may be determined for a period in time, especially a period, which extents into future. On the basis of such distances $d_{yi}$ predictions about the arrangement of the portable terminals $UE_i$ to be expected can be concluded.

In an operation S430, context information is selected from a context information storage, e.g. a database, in accordance with the object-terminal distances $d_{xij}$ and/or the terminal distances $d_{yi}$ determined before.

That means for example that detailed context information about the nearest object $OBJ_{ij}$ (at distance $d_{next}$) is selected. The context information about object $OBJ_{ij}$, which are spaced at a greater distance (i.e. $d_{ij} > d_{next}$), will be hidden or only sketchy context information will be selected.

Supplementary, although a nearest object $OBJ_{ij}$ (at distance $d_{next}$) has been selected, the terminal distance $d_{yi}$ may be also considered. For instance, in case terminal distance $d_{yi} \geq d_{block}$, where $d_{block}$ is a predefined distance value, the selected context information is hidden. Otherwise the selected context information not blocked.

In general, the context information according to the present invention is distance-based or distance-dependent. That means, the contents of the context information to be transmitted finally to the portable terminal $UE_i$ depends on an absolute distance quantity, on a distance quantity relative to the available object-terminal distances $d_{xij}$ and/or the terminal distances $d_{yi}$.

Correspondingly, the context information associated with each object may vary with the distance. Alternatively, the context information associated with each object may comprise a set of context information each valid for a predefined distance range. Further conditions may be introduced for distance-selective context information provision.

In an operation S440, the selected context information is transmitted to the respective portable terminals $UE_i$ subscribed to the context information service and available for serving. The transmission may utilize a data push service, where the portable terminals $UE_i$ receive automatically the selected context information. Alternatively, the transmission may be operated as a data pull service, where the portable terminals $UE_i$ receive the selected context information in response to a request therefor.

In an operation S450, the context information provision is completed.

Due to the fact that the objects $OBJ_{ij}$ and portable terminals $UE_i$ are allowed to move in time within the space, i.e. the positions $x_{ij} = x_{ij}(t)$ and $y_i = y_i(t)$ are functions in time, respectively, the context information provision according to the presented embodiment of the present invention may be iterated to guarantee context information which are relevant to the present environmental conditions and up to date.

In an operation S460, the operational sequence may be operated and continues with operation S400. The iteration may be paused for a predefined period in time or the iteration may be event-driven, i.e. the iteration starts on a certain event such as changing distance arrangements relevant for a portable terminal $UE_i$.

It shall be noted that the aforementioned operational sequences, which primarily described the provision of context information associated with objects $OBJ_{ij}$, is also operable to server context information associated with portable terminals $UE_i$. This means, context information can be associated also with portable terminals $UE_i$, which associated context information is handled likewise as described in view of the objects $OBJ_{ij}$.

Each infrastructure element $BS_k$ administrates the context information for being served. The administration operation of the context information shall comprise a provision of the context information and objects $OBJ_{ij}$, a maintaining of the context information and objects $OBJ_{ij}$, a configuring of the context information and objects $OBJ_{ij}$, an updating of the context information and objects $OBJ_{ij}$ etc, which may be required due to the interaction with the portable terminals $UE_i$, the changing of the environment and objects $OBJ_{ij}$, with which the context information is associated, and the like.

Additionally, a central server may be provided for centralized and/or supplementary administrating the context information of the infrastructure elements $BS_k$. The central server as illustrated in FIG. 2 may be connected to the infrastructure elements $BS_k$ via any data communication network. The administration operation of the central server includes analogous administration operations as described above in view of the administration operations performed by the infrastructure element $BS_k$.

The above-described operational sequence relates primarily to the provision of context information by the infrastructure element $BS_k$ to be received by the portable terminals $UE_i$. Those skilled in the art will appreciate on the basis of the given description, that the portable terminals $UE_i$ may also supply information to the infrastructure element $BS_k$. For instance, when employing terminal-based position technology for determining the actual position of the portable terminals $UE_i$, the required position information are uploaded from the portable terminals $UE_i$ to the infrastructure element $BS_k$. Additionally, the uploaded information/data can also be handled by receiving infrastructure element $BS_k$ as context information. This means, the uploaded information may be added to the information storage for being provided as context information afterwards, the uploaded information may be used to modify or update context information being presently stored etc. Further, uploaded information may be taken into consideration for the selection operation of the context information to be served by the infrastructure element $BS_k$. This means, the uploaded information serve as supplementary filter information, on the basis of which the selection operation described above can be enhanced.

As aforementioned with reference to FIG. 2, the coverage areas COV and/or the regions of interest ROI may or may not overlap. In case of overlapping, context information associated with objects OBJ, which are situated in the overlapping part coverage areas COV and regions of interest ROI, respectively, may be served by each of the respective infrastructure elements BS. In order to ensure consistence of the context information served by the infrastructure elements BS with overlapping coverage areas COV or regions of interest ROI, these infrastructure elements BS balances the objects OBJ and the context information thereof, respectively, by exchanging corresponding information with each other. The required information exchange may be performed via any data communication network connecting the infrastructure elements BS, for instance the data communication network, illustrated in FIG. 2. The balancing of the objects OBJ and context information may under control of the central server or may be performed by the central server.

The balancing of context information and objects may be also required in case the position of a moving object OBJ moves into another region of interest (ROI). The infrastructure element BS currently administrating the moving object OBJ and the context information thereof, respectively, may inform the infrastructure element BS, which region of interest ROI the moving objects OBJ enters, about the moving object and the context information thereof, respectively. The required information exchange may be performed via any data communication network connecting the infrastructure elements BS, for instance the data communication network illustrated in FIG. 2. The information exchange relating to the moving object OBJ and context information thereof may under control of the central server or may be performed by the central server.

Use case: Central Bus Station/Bus Stop
Requirements and Setup:
In this use case a portable terminal in question should comprise a wireless data interface and a position acquisition module/system (e.g. a Bluetooth transceiver and a GPS receiver).

A central bus station or a bus stop is equipped with at least one infrastructure element including a wireless data interface adapted for data communication with portable terminals comprising corresponding wireless data interface. Preferably, the each infrastructure element spans a cell (i.e. has a coverage area) for wireless data communication and is responsible for each physical (real-world) object within the cell, for which context information may be provided to the portable terminal. Cells may have different dimensions and adjacent cells preferably overlap. The infrastructure elements have fixed positions, which are known to the infrastructure elements.

The physical objets may relate to bus stops, bus stations/platforms, notice boards, timetable boards, etc, which represent stationary objects. The positions of the stationary objects may be configured (permanently) in the corresponding infrastructure elements, which cell includes the stationary object. Additionally, the physical objets further relate to busses, which represent non-stationary objects varying in position and time. The position of the time/position variable objects may be provided by the variable objects (via the wireless data interfaces of the infrastructure elements) or may be remote-configured via a central server configuring and updating the required information about the variable objects.

Concept Framework:
As soon as a user with its portable terminal of the kind defined above enters a cell of an infrastructure element, data communication between the user's portable terminal and the corresponding infrastructure element of the entered cell is established. On the basis of the position of the user's portable terminal, which position is herein determined by the portable terminal and transmitted to the infrastructure element, the infrastructure element is able to serve distance-dependent context information expected to be relevant for the user of the portable terminal.

Examples
For instance, the infrastructure element detects that the portable terminal is situated in close proximity to a certain bus top or bus station/platform, where close proximity may be understood than the next bus stop/station/platform (or any other object managed by the infrastructure element), closer than a predefined maximum distance or a combination thereof. Accordingly, the infrastructure element transmits a timetable to the portable termninal, which informs the user about the actual bus traffic situation such as expected arrivals, delays, cancellations, alternative routes.

Further, the infrastructure element detects that the portable terminal is situated in close proximity to a certain bus top or bus station/platform, which is headed by a bus. Accordingly, the infrastructure element transmits an information to the portable terminal about number and destination of the heading bus.

Further, the infrastructure element detects that the portable terminal moves into a bus, i.e. the distance between the position of the object representing the bus and the position of the portable terminal minimizes. Accordingly, the infrastructure element transmits context information about an electronic ticket to be purchased by the user or alternatively, the infrastructure element transmits context information causing automatically the purchase of an electronic ticket.

Moreover, the infrastructure element detects that the portable terminal is situated in close proximity to a timetable board. Accordingly, the infrastructure element transmits context information comprising audio data, which, when reproduced by the portable terminal, reads the timetable, which is especially of interest for handicapped users.

Use Case: Gaming Scenario (1)
Requirements and Setup:
In this use case a portable terminal in question should comprise a wireless data interface and a position acquisition module/system (e.g. a Bluetooth transceiver and a GPS receiver).

A gaming area is equipped with at least one infrastructure element including a wireless data interface adapted for data communication with portable terminals comprising corresponding wireless data interface. Preferably, the each infrastructure element spans a cell (i.e. has a coverage area) for wireless data communication and is responsible for each physical (real-world) object within the cell and for each virtual object associated with the cell, for which context information may be provided to the portable terminal. Cells may have different dimensions and adjacent cells preferably overlap. The infrastructure elements have fixed positions, which are known to the infrastructure elements.

Concept Framework:

The gaming area is constituted by a real-world gaming environment such as an indoor gaming facilities having concatenated rooms, tunnels, labyrinths etc. and/or outdoor gaming facilities constituted by parks, country terrain, urban terrain, sites etc. The game scenario is based on a semi realistic environment, to which the real-world gaming environment with a selection of real-world objects is mapped and to which supplementary virtual objects are added. Both the real-word objects and the virtual objects are provided with (stationary of variable) positions. The combination of a real-world gaming environment with real-world objects and virtual objects having a virtual position with respect to the real-world gaming environment create a gaming scenario with augmented reality for the participants of the gaming scenario.

Due to the composition of the gaming scenario comprising real-world elements and virtual elements, a participant moving through the real-world gaming environment moves correspondingly through the semi realistic environment of the gaming scenario.

Each infrastructure element administrates (handles, manages, maintains) the set of objects, which are assigned to its cell (i.e. coverage area). Correspondingly, each infrastructure element serves for context information associated to the administrated objects.

Examples

A participant may enter the cell of a specific infrastructure element. The data communication between the portable terminal of the participant and the infrastructure element is established at the moment in time of entering the cell. The infrastructure element may firstly transmit information about the objects being present in the cell (coverage area COV) or the region of interest ROI; i.e. about the real-world objects and the virtual objects being positioned and having assigned a position within the entered cell, respectively.

The infrastructure element may further serve information about the position of virtual objects, which are not represented in the real-world gaming environment, in which the participant moves. The infrastructure element may transmit routing information relating to the required movement of the participant.

Details about for instance virtual objects may only be available to the participant, when the participant is close to a real-world position (in the real-world gaming environment), which is assigned to the virtual object. On registering of the infrastructure element, that the portable terminal of the participant is close to the aforementioned position of the virtual object, the infrastructure element transmits information about object details such as picture representation, shape, dimensions, color, function etc and or information about which tasks may be performed in conjunction with the virtual objects such as picking up the virtual object, moving of the virtual object, applying of the virtual object etc. Any further features and functions of multi-player role games may be adapted to the above-presented gaining scenario.

Use Case: Gaming Scenario (2)

An adapted gaming area is represented by a real-world gaming environment constituted for instance by an empty room, empty hall etc. The game scenario is based on a complete virtual environment, which is mapped to the real-world gaming environment (empty room empty hall), which is equipped with one or more infrastructure elements having coverage areas for wireless communication. The infrastructure elements serve for instance information about a complete different space, i.e. the virtual environment, to which for instance a remote city, a virtual world etc is mapped. Correspondingly, the regions of interest are defined within the virtual environment and the regions of interest are associated to the one or more infrastructure elements in an adequate way. The regions of interest from the virtual world and the virtual world is defined with respect to the regions of interest, respectively.

The gaming task to be solved by users is for example to find a predefined building of the remote city, a predefined location of the virtual world etc mapped to the real-world gaming environment. A movement of a portable terminal within the real-world gaming environment (i.e. the room, hall etc) is transposed to locomotion within the virtual environment (i.e. the city, the virtual world). As soon as a user of a portable terminal is located at a position in the real-world environment, which is transposed as a position near the position of the virtual environment, the user has solve the task set. In the context of the search task the user of the portable terminal is supplied with information relating to the virtual position of the user via the infrastructure elements, on the basis of which the set task is achievable. As aforementioned, the virtual position of the user is obtained from the position of its portable terminal within the real-world gaming environment transposed to the virtual world.

Use Case: Exhibition/Museum

Requirements and Setup:

In this use case a portable terminal in question should comprise a wireless data interface and a position acquisition module/system (e.g. a Bluetooth transceiver and a GPS receiver).

An exhibition area or a museum is equipped with at least one infrastructure element including a wireless data interface adapted for data communication with portable terminals comprising corresponding wireless data interface. Preferably, the each infrastructure element spans a cell (i.e. has a coverage area) for wireless data communication and is responsible for each (real-world) object within the cell, for which context information may be provided to the portable terminal. The object shall herein represent exhibits displayed to the visitors. Cells may have different dimensions and adjacent cells preferably overlap. The infrastructure elements have fixed positions, which are known to the infrastructure elements.

Concept Framework:

The infrastructure elements shall serve electronic information about the exhibits, which are available for being visited. The infrastructure elements serve as an electronic guide.

Examples

The infrastructure element detects that the portable terminal is enters a cell, the coverage area of which covers a certain exhibition area, room, space, hall etc, within which several exhibits are arranged for being studied. Accordingly, the infrastructure element transmits an information to the portable terminal about brief introductions relating to each exhibit.

Further, the infrastructure element detects that the portable terminal approaches a certain exhibit. Accordingly, the infrastructure element transmits detailed information about the exhibit approached by the portable terminal.

Moreover, the infrastructure elements which track the movement of the subscribed portable terminals are able to route the users of the detects portable terminals though the museum/exhibition, in particular in case the user have uploaded information about one or more exhibit of interest, which he wants to study.

Even though the invention is described above with reference to embodiments according to the accompanying drawings, it is clear that the invention is not restricted thereto but it can be modified in several ways within the scope of the appended claims.

The invention claimed is:

1. A method comprising:
   causing, at least in part, on an apparatus, storage of context information associated with a predefined environment that is associated with the apparatus, wherein said apparatus handles said context information, and said context information is centrally administered by a central server:
   determining a position of a mobile terminal device when said mobile terminal is located within a coverage area of said apparatus;
   selecting said context information in accordance with said determined position and said predefined environment associated with the apparatus;
   causing, at least in part, a transmission of said selected context information to said mobile terminal for being processed thereon; and
   providing a plurality of objects, wherein each object is associated with said context information, wherein each object has a position, which is defined with reference to said defined environment, wherein each of said terminal to object distances comprises one out of a group of distance quantities including:
   (a) a distance between said position of said mobile terminal and each position of said plurality of objects; and
   (b) a distance between said position of said mobile terminal and said position of said apparatus.

2. The method according to claim 1, further comprising:
   obtaining said position of said mobile terminal by the means of terminal-based position technology or network-based position technology.

3. The method according to claim 1, comprising:
   determining terminal to object distances on the basis of positions of said mobile terminal and said plurality of objects; and
   selecting said context information in accordance with said terminal to object distances.

4. The method according to claim 3, wherein said determining further comprises:
   determining said terminal to object distances at a point in time; or
   determining said terminal to object distances over a period of time.

5. The method according to claim 1 wherein said position of said mobile terminal and/or said positions of a plurality of objects is/are allowed to vary in time.

6. The method according to claim 1 wherein contents of said context information associated with at least one of said objects depends on said terminal to object distance.

7. The method according to claim 1, wherein said coverage area differs from said defined environment.

8. The method according to claim 1 wherein said context information comprises information out of a group of information including information to be displayed to a user of said mobile terminal, information for being processed by said mobile terminal and instructions instructing said mobile terminal to operate correspondingly.

9. The method according to claim 1, wherein said defined environment is mapped to a digital representation, which comprises said plurality of objects.

10. The method according to claim 1 wherein one or more objects of said plurality of objects represent physical objects being present within said defined environment.

11. The method according to claim 1 wherein one or more objects of said plurality of objects represent virtual objects, which require no physical correspondence within said defined environment.

12. A non-transitory computer-readable storage medium carrying one or more sequences of one or more instructions which, when executed by one or more processors, cause an apparatus to at least perform the following:
    cause, at least in part, on the apparatus, storage of context information associated with a predefined environment that is associated with the apparatus, wherein said apparatus handles said context information, and said context information is centrally administrated by a central server,
    determine a position of a mobile terminal device when said mobile terminal device is located within a coverage area of said apparatus;
    select said context information in accordance with said determined position and said predefined environment associated with the apparatus;
    cause, at least in part, a transmission of said selected context information to said mobile terminal for being processed thereon; and
    provide a plurality of objects wherein each object is associated with said context information, wherein each object has a position, which is defined with reference to said defined environment, wherein each of said terminal to object distances comprises one out of a group of distance quantities including:
    (a) a distance between said position of said mobile terminal and each position of said plurality of objects; and
    (b) a distance between said position of said mobile terminal and said position of said apparatus;
    wherein several predefined environments form a gaming area in a gaming scenario.

13. The non-transitory computer-readable storage medium of claim 12, wherein the apparatus is further caused to:
    determine terminal to object distances on the basis of positions of said mobile terminal and said plurality of objects; and
    select said context information in accordance with said terminal to object distances.

14. The non-transitory computer-readable storage medium of claim 13, wherein the apparatus is further caused to:
    determine said terminal to object distances at a point in time; or
    determine said terminal to object distances over a period of time.

15. An apparatus comprising:
    at least one processor; and
    at least one memory including computer program code,
    the at least one memory and the computer program code configure to, with the at least one processor, cause the apparatus to perform at least the following:
    a) cause, at least in part, a storage of context information, which is associated with a defined environment of said apparatus, wherein several predefined environments form a gaming area in a gaming scenario, wherein said context information is centrally administered by a central server;

b) handle said context information;
c) determine a position of a mobile terminal device when said mobile terminal is located within a coverage area of said apparatus;
d) select said context information in accordance with said position and said defined environment
e) causing, at least in part, a transmission of said selected context information to said mobile terminal for being processed thereon;
f) provide a plurality of objects, each of which is associated with said context information and each of which has a position, which is defined with reference to said defined environment;
g) determine terminal to object distances on the basis of positions of said mobile terminal and said plurality of objects;
h) select said context information in accordance with said terminal to object distances;
i) determine said terminal to object distances between said position of said mobile terminal and each position of said plurality of objects; and/or determine said terminal to object distances between said position of said mobile terminal and said position of said apparatus.

16. The apparatus of claim 15, wherein the apparatus is further caused to:
determine said terminal to object distances at a point in time; and
determine said terminal to object distances over a period of time.

17. The apparatus according to claim 16, wherein said apparatus is further caused to, at i), determine said terminal to object distances between said position of said mobile terminal and each position of said plurality of objects, and determine said terminal to object distances between said position of said mobile terminal and said position of said apparatus.

18. The apparatus according to claim 16, wherein said apparatus is further caused to, at i), determine said terminal to object distances between said position of said mobile terminal and each position of said plurality of objects, or determine said terminal to object distances between said position of said mobile terminal and said position of said apparatus.

19. The apparatus of claim 15, wherein contents of said context information associated with at least one of said objects depends on said terminal to object distances.

20. The apparatus of claim 15, wherein said coverage area differs from said defined environment.

21. The apparatus of claim 15, wherein said defined environment corresponds to a digital representation thereof, which comprises said objects, each of which represents one out of a physical object and a virtual object.

22. A system comprising:
a plurality of apparatuses; and
at least one mobile terminal,
wherein each apparatus is adapted for serving context information of an individually defined environment of each individual apparatus, wherein several predefined environments form a gaming area in a gaming scenario, wherein said context information is administrated by a central server;
said mobile terminal comprising:
a wireless data interface adapted for data communication with said apparatuses;
wherein each apparatus is adapted for serving context information to a mobile terminal device when located within a coverage area of said respective apparatus, each of said apparatuses are configured to:
store context information, which is associated with its defined environment;
handle said context information;
determine at least a position of said mobile terminal;
select said context information in accordance with said position and said defined environment;
cause, at least in part, a transmission of said selected context information to said mobile terminal for being processed thereon;
determine terminal to object distances on the basis of positions of said mobile terminal and said plurality of objects; and/or determine said terminal to object distances between said position of said mobile terminal and said position of said apparatus; and
select said context information in accordance with said terminal to object distances.

23. The system according to claim 22, wherein said individually defined environments of said infrastructure entities overlap.

24. The system according to claim 22, wherein a plurality of objects are provided, each of which is associated with said context information and each of which has a position, which is defined with reference to one of said defined environment.

25. The system according to claim 24, wherein coverage area of at least one of said apparatuses differs from said defined environment of at least one of said apparatus.

26. The according to claim 22, wherein said apparatuses are further configured to:
determine said terminal to object distances at a point in time; and
determine said terminal to object distances over a period of time.

27. The system according to claim 22, wherein contents of said context information associated with at least one of said objects depends on said terminal to object distances.

28. The system according to claim 22, wherein said defined environment corresponds to a digital representation thereof, which comprises said objects, each of which represents one out of a physical object and a virtual object.

* * * * *